UNITED STATES PATENT OFFICE.

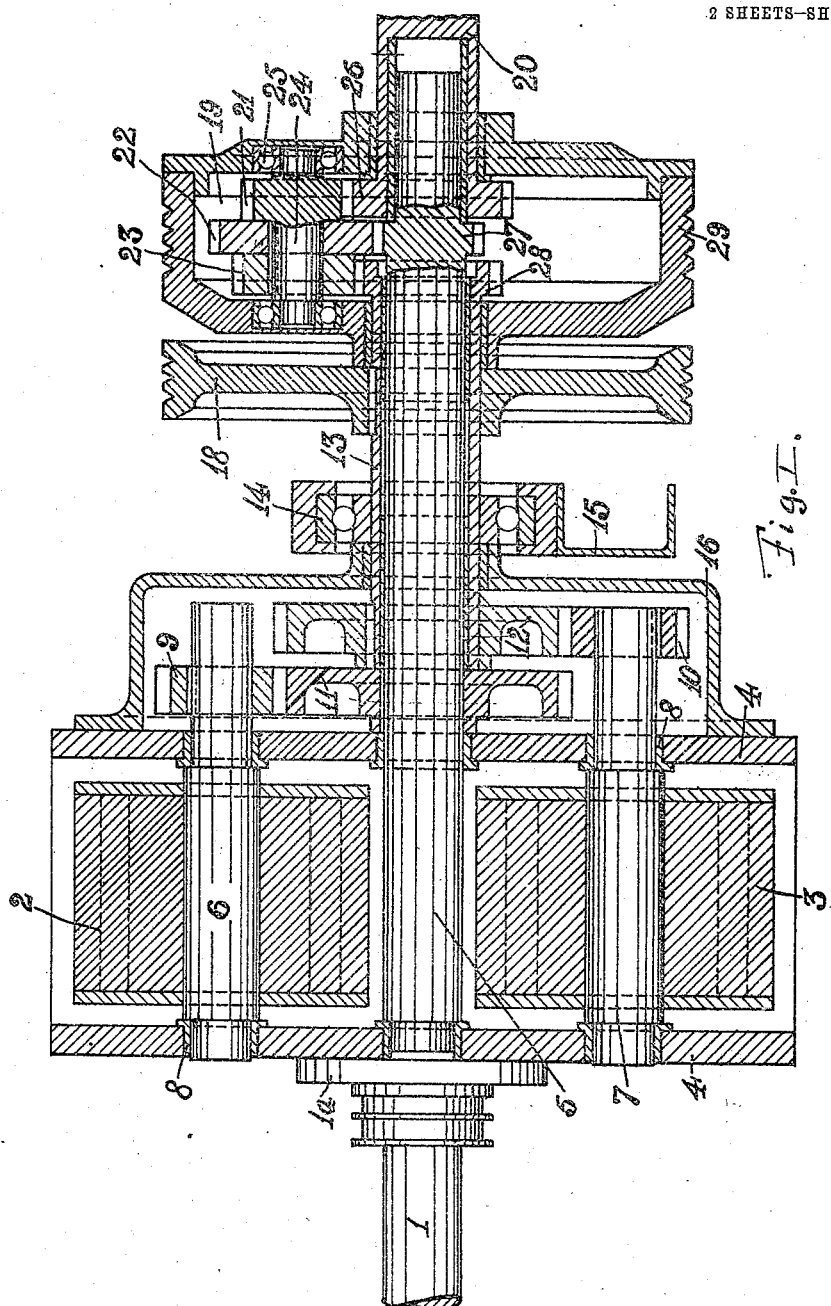

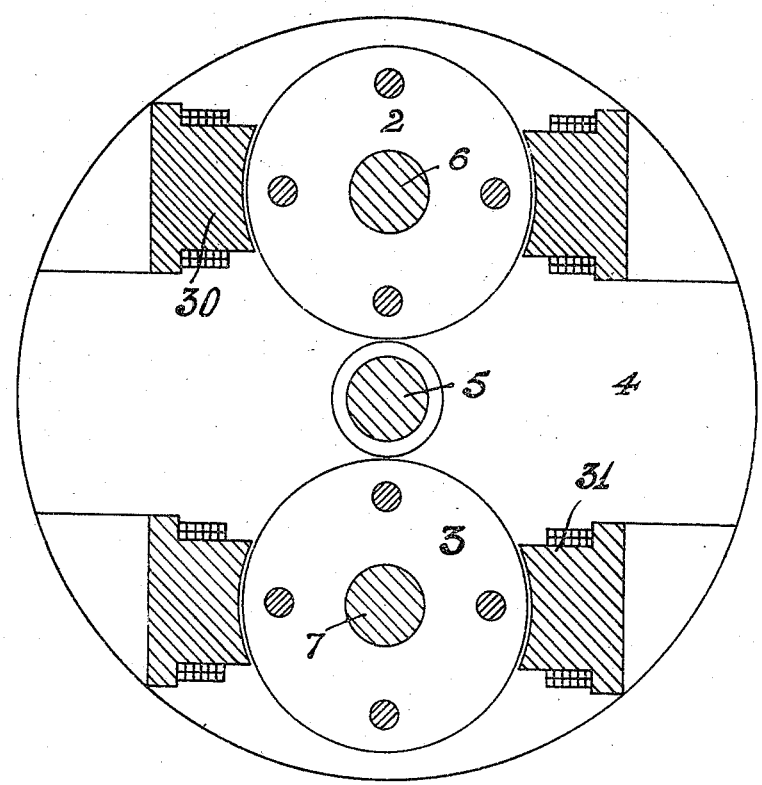

ARTHUR CHARLES KING, OF SOUTHGATE, AND FREDERICK HAMER, OF HAYES, ENGLAND.

TRANSMISSION-GEARING.

995,684.

Specification of Letters Patent. Patented June 20, 1911.

Application filed November 19, 1909. Serial No. 528,885.

*To all whom it may concern:*

Be it known that we, ARTHUR CHARLES KING and FREDERICK HAMER, subjects of the King of Great Britain and Ireland, residing, respectively, at Southgate and Hayes, in the county of Middlesex, England, have invented new and useful Improvements in Transmission-Gearing, of which the following is a specification.

This invention relates to the transmission of power from a prime mover to a load, and to power transmission systems or mechanisms in which the prime mover is connected with, or is geared to, the load through the intermediary of a combined clutch and variable speed gear device comprising a dynamo-electric element and epicyclic gearing.

In particular, the invention relates to power transmission systems or mechanisms in which the prime mover rotates the field magnet structure of the dynamo-electric element and the load is connected to one member of epicyclic or sun and planet gearing, said member being geared to the armature part of the dynamo-electric element and said armature part being mounted so as to be rotatable about its own axis and about the axis of the field magnet structure, the arrangement being such that when the field magnet structure is rotated, compound rotation is imparted to the armature part, the rotation of the armature part about its own axis, when the field magnet structure is energized, being retarded more or less according to the excitation of the field magnet structure and the power transmitted to, or the speed of, the load correspondingly varied. Such a power transmission system or mechanism is described and claimed in the specification of Letters Patent No. 945,398, dated January 4th, 1910, and the object of the present invention is to provide improvements therein or thereto whereby a direct drive, drives at intermediate and fixed speeds and a reverse drive may be obtained.

The present invention, like the invention described and illustrated in the specification and drawings of the Letters Patent to which reference has been already made, will be particularly applicable for use in the transmission of power from the motor of a motor propelled road vehicle to the road wheels.

In the accompanying drawings Figure 1 illustrates diagrammatically and in longitudinal central section an arrangement of power transmission mechanism, or of a power transmission system in accordance with the present improvements. Fig. 2 is a transverse section through the dynamo electric machine shown in Fig. 1.

In carrying out the present invention, the field magnet structure of the dynamo-electric element is rotatable and is mounted on, or is connected with a shaft 1 that is driven by, or from the prime mover. As in the arrangement described and illustrated in the specification and drawings to which reference has already been made, the field magnet structure is of compound formation, that is to say, it has a plurality of pairs of poles or field magnets, and these poles, instead of being spaced apart in or around a circle, as in ordinary multipolar dynamo-electric machines, and acting upon a single armature mounted to rotate between the polar faces, are arranged in pairs, each pair of poles acting upon an armature. Each pair of poles with its armature thus constitutes or forms a two-pole dynamo electric machine. In the present arrangement, it is assumed that the dynamo-electric element comprises two two-pole machines but it will be apparent that the element might comprise more than two two-pole machines, for example, it may comprise four two-pole machines.

2, 3 are the armatures of the two-pole machines, the poles or field magnets being indicated at 30 and 31. However many two-pole machines are employed, the pair of poles and armature of each machine are mounted on and carried by a carrier such that the dynamo-electric element as a whole is rotatable. In the arrangement illustrated in the drawing, the carrier comprises two disks 4. These disks 4 are mounted on an intermediate shaft 5 so as to be capable of rotation relatively thereto and are arranged at such a distance apart that the poles and armatures of the dynamo-electric machines are inclosed or contained between them. The disks are connected together by reason of the mounting or carrying of the poles thereon or thereby and will therefore rotate as one. One of the disks 4 is connected with the shaft 1, this shaft being provided with a flange 1ª to which the disk is bolted. When the prime mover is started up and the shaft 1 is set in rotation, the carrier 4 is rotated therewith and with it the pairs of poles and armatures.

The poles in the arrangement illustrated are assumed to be arranged and disposed in such a manner that the shafts 6, 7 on which the armatures 2, 3 respectively are mounted, are parallel with the intermediate shaft 5. The shafts 6, 7 are mounted in bearings 8 formed or provided in the disks 4 and the bearings in the disk 4 remote from the shaft 1 are such that the shafts 6, 7 extend therethrough and beyond the outer face of the disk. On such projecting end of the armature shafts a spur wheel is mounted.

9 is the spur wheel mounted on the shaft 6 and 10 that on the shaft 7. From the drawing it will be seen that the spur wheels 9, 10 are not in the same vertical plane, the spur wheel 10 being mounted nearer the end of the shaft 7 than is the spur wheel 9 on the shaft 6. The shafts 6, 7 are shown as of the same length but it will be apparent that the shaft 6 may be shorter than the shaft 7 in which case the spur wheel 9 would be mounted at or near the end of this shaft. The disposition of the spur wheels 9, 10 as just described is adopted in order to allow each spur wheel to gear with a separate spur wheel. 11, 12 are these spur wheels. The spur wheel 9 gears with the spur wheel 11 and the spur wheel 10 with the spur wheel 12. The spur wheels 9, 10 may be, as shown, of the same size and the spur wheels 11, 12 may also be alike but preferably the spur wheel 12 is larger than the spur wheel 11, the proportions of the spur wheels being approximately as the ratios of the gears in the gear box 19 hereinafter described. The spur wheel 11 is keyed or mounted on the intermediate shaft 5 and the spur wheel 12 on a sleeve 13 that is mounted on and is rotatable relatively to the intermediate shaft 5. The gearing just described is inclosed within a casing 16 that is fixed to the outer face of the disk 4 remote from the shaft 1.

14 is a bearing that supports the sleeve 13 and also the intermediate shaft 5 at a point exterior the casing 16. This bearing 14 is carried by a member 15, which, when the invention is used in connection with a motor propelled road vehicle, may form or be a transverse member of the chassis. The member 15 is shown as of channel section. The gearing 9, 11 and the gearing 10, 12 form two sets of sun and planet gearing.

Current for the energizing of the field magnets of the dynamo-electric machines is derived from a suitable source of energy, such as a secondary battery or from an exciter driven by the prime mover or by other motor. The windings or energizing coils of the field magnets are connected to a controller which is such that the field magnets of one dynamo-electric machine can be excited without reference to the other dynamo-electric machine, or both dynamo-electric machines can be energized at the same time. The construction of the controller forms no part of the present invention, and it will be apparent that a controller to act as described and to vary the current through the field windings or the connection of the field windings (series, parallel or series-parallel) may be of any suitable description. The variation of the current strength in the field windings or the connection of the field windings will cause variations in the strengths of the magnetic fields of the dynamo-electric machines and these variations in field strength will result in alterations in the drive as well understood and as will also be presently explained.

18 is a brake drum. This brake drum is mounted or keyed to the sleeve 13 and is positioned on the sleeve on the side of the bearing 14 remote from the dynamo-electric element. It will be apparent however that the brake drum could be placed between the bearing 14 and the dynamo-electric element.

19 is a gear box. This box is mounted at one side on the sleeve 13 and on the other side upon a shaft 20 that communicates the drive to the load. The box is rotatable relative to the sleeve 13 and shaft 20, and contains three pinions 21, 22, 23 which are made integral and are keyed or otherwise fixed on a shaft 24 mounted at its ends in ball bearings 25 formed or provided in the walls of the gear box. The pinions 21, 22, 23 instead of being integral may be separate and each fixed independently to the shaft 24. The pinions 21, 22, 23 respectively engage with a pinion 26 keyed or otherwise fixed or mounted on the shaft 20, a pinion 27 keyed or otherwise fixed or mounted on the intermediate shaft 5 and a pinion 28 keyed or otherwise fixed or mounted on the sleeve 13. The gear box is provided with a brake surface 29 and with a brake band, not shown, by which the gear box may be held against rotation. The brake drum 18 is also provided with a brake band, not shown. The brake drum 18 and gear box 19 instead of being braked mechanically may be held electrically, electromagnetically or otherwise.

The operation of the mechanism thus far described is as follows:—The prime mover is started up and is clutched to the shaft 1 which is consequently set in rotation, rotating at the same time the carrier 4 and with it the poles and armatures 2, 3 about the intermediate shaft 5. When the carrier 4 is rotated about the intermediate shaft 5, the armatures 2, 3 are also set in rotation about their axes by reason of the engagement of the spur wheels 9, 10 with the spur wheels 11, 12 which latter remain stationary by reason of the load connected thereto through the shaft 20, the gear box 19, intermediate shaft 5 and sleeve 13. The controller is now operated and one of the dynamo-electric machines is energized. For the purposes of this description it will be assumed that the dynamo-electric machine which is energized is that of which 2 is the armature. When the dynamo-electric machine mentioned is energized, the armature 2 is rotated in a magnetic field and its rotation is retarded more or less according to the strength of the magnetic field produced. If the magnetic field be gradually increased from *nil* to full strength, the resistance to rotation of the armature will correspondingly increase and when the field is at full strength the armature will be almost wholly held stationary relatively to its poles. The gradual and increasing opposition offered to the rotation of the armature will cause a gradual and increasing torque to be set up between the spur wheels 9 and 11 and when this torque is sufficient it will overcome the resistance to movement offered by the load and drive the same. The load will be driven with a gradually increasing speed until it obtains the full speed allowed by the gearing in the gear box 19. The power is transmitted to the load from the spur wheel 11 through the intermediate shaft 5, pinions 27, 22, shaft 24, pinions 21, 26 and shaft 20. The gear box 19 is also maintained stationary by the band brake. If now the controller be further operated the dynamo-electric machine of which 2 is the armature will be deënergized and the dynamo-electric machine of which 3 is the armature will be brought into action, the drive then being through the spur wheels 10, 12, sleeve 13, pinions 28, 23, shaft 24, pinions 21, 26 and shaft 20, the gear box being held stationary as before. If now the controller be further operated the armatures 2, 3 will both be caused to rotate in magnetic fields and the drive will be a direct one as the gears in the gear box 19 become locked against relative rotation. The brake at this time is taken off the gear box 19.

A reverse drive is obtained by releasing the brake on the gear box 19 and braking the drum 18, the dynamo-electric machine of which 2 is the armature being energized. The drive is then through the intermediate shaft 5, pinions 27, 22, shaft 24, pinions 21, 26 and shaft 20. The gearing in the gear box when the reverse drive is required acts as an epicyclic train but when the forward and direct drives are in use it acts as a simple train of gearing.

From the foregoing description it will be seen that power may be transmitted at three fixed and determined speeds in a forward direction and that speeds intermediate the fixed speeds may be obtained by regulation of the strengths of the magnetic fields of the dynamo-electric machines.

The brake has been mentioned as a mechanical brake and other kinds of brake have also been referred to; it will, however, be well to use electric or electromagnetic braking as then the connections can be controlled by the same controller as that which regulates the dynamo-electric machines and all chance of incorrect manipulation avoided.

What we claim is:—

1. In a power transmission system, the combination with the driving shaft, of a shaft to be driven, dynamo electric machines having one structure thereof driven by said driving shaft, mechanism comprising gearing connecting the other structure to the shaft to be driven, said mechanism being adapted to drive the shaft in one direction as an ordinary gear train and in the reverse direction as an epicyclic gear train.

2. In a power transmission system, the combination with the driving shaft, of a shaft to be driven, dynamo electric machines having one structure thereof driven by said driving shaft, gearing connecting the other structure with the shaft to be driven and means adapted to cause the gearing to drive said shaft in either direction.

3. In a power transmission system, the combination with the driving shaft, of a shaft to be driven, dynamo electric machines having one structure thereof driven by said driving shaft, variable speed gearing connecting the other structure to the shaft to be driven whereby the shaft may be driven at different speeds and means acting with said gearing whereby said shaft may be driven directly.

4. In a power transmission system, the combination with the driving shaft, of a shaft to be driven, dynamo electric machines having one structure thereof driven by said driving shaft, variable speed gearing connecting the other structure to the shaft to be driven whereby the shaft may be driven at different speeds and means acting with said gearing for driving said shaft in the reverse direction.

5. In a power transmission system, the combination with the driving shaft, of a shaft to be driven, dynamo electric machines having one structure thereof driven by said driving shaft, variable speed gearing connecting the other structures of said machines with the shaft to be driven and means coöperating with said gearing whereby the latter will act as an ordinary gearing train or as an epicyclic gearing train.

6. In a power transmission system, the combination with the driving shaft, of a shaft to be driven, dynamo electric machines having one structure thereof driven by said driving shaft, variable speed gearing connecting the other structures of said machines with the shaft to be driven and brakes adapted to control said gearing whereby the shaft may be driven forward or reverse.

7. In a power transmission system, the combination with the driving shaft, of a shaft to be driven, a dynamo electric machine having one structure thereof driven by the driving shaft, an intermediate shaft to which the other structure is connected, a second dynamo electric machine having one structure driven by the driving shaft, a second intermediate shaft to which the other structure of the said second machine is connected, variable speed gearing connecting said intermediate shaft with said shaft to be driven and means acting with said gearing for driving said driven shaft in a forward or reverse direction.

Dated this 6th day of November, 1909.

ARTHUR CHARLES KING.
FREDK. HAMER.

Witnesses:
B. O. BUTLER,
W. CRAWLEY.